US008636822B1

(12) United States Patent
Boyce et al.

(10) Patent No.: US 8,636,822 B1
(45) Date of Patent: Jan. 28, 2014

(54) DETHATCHING, EXTENDED RELEASE FERTILIZER COMPOSITIONS

(71) Applicants: Kenneth J. Boyce, Fort Myers, FL (US); Kevin C. Carson, Cape Coral, FL (US)

(72) Inventors: Kenneth J. Boyce, Fort Myers, FL (US); Kevin C. Carson, Cape Coral, FL (US)

(*) Notice: Subject to any disclaimer, the term of this patent is extended or adjusted under 35 U.S.C. 154(b) by 0 days.

(21) Appl. No.: 13/915,239

(22) Filed: Jun. 11, 2013

Related U.S. Application Data

(60) Provisional application No. 61/657,955, filed on Jun. 11, 2012.

(51) Int. Cl.
    C05D 9/02     (2006.01)
    C05F 11/00    (2006.01)
    C05F 11/02    (2006.01)
    C05B 7/00     (2006.01)
    C05B 17/00    (2006.01)
    A01N 25/00    (2006.01)

(52) U.S. Cl.
    USPC ............ 71/24; 71/11; 71/27; 71/32; 71/64.07

(58) Field of Classification Search
    USPC ...................................... 71/23–30
    See application file for complete search history.

(56) References Cited

U.S. PATENT DOCUMENTS

| 5,876,479 A * | 3/1999 | Hedgpeth, IV | 71/11 |
| 2002/0057947 A1* | 5/2002 | Schraven | 405/264 |
| 2002/0178772 A1* | 12/2002 | Hince | 71/31 |
| 2011/0036009 A1* | 2/2011 | Bissonnette et al. | 47/59 S |
| 2011/0152363 A1* | 6/2011 | Knochenmus et al. | 514/494 |
| 2011/0224080 A1* | 9/2011 | Lelas et al. | 504/124 |

OTHER PUBLICATIONS

Outdoor Water Use. EPA. Environmental Protection Agency, May 2013. Web. Aug. 27, 2013.http://www.epa.gov/watersense/pubs/outdoor.html.

* cited by examiner

*Primary Examiner* — Jennifer Smith
(74) *Attorney, Agent, or Firm* — Nilay Choksi; Smith & Hopen, P. A.

(57) ABSTRACT

A granule fertilizer composition with dethatching agent. The fertilizer composition includes natural potassium, various micronutrients, humic acid and composted humus. Ingredients of the composition may include humic acid, nitrogen, sulfur, potash, iron, manganese, magnesium, and/or inert ingredients. In an embodiment, each ingredient is polymer-coated, depending on the needs of the user. The current invention also enables a method of manufacturing a fertilizer composition, along with methods of fertilizing, dethatching and irrigating a finite area of turf using a fertilizer composition. The novel fertilizer composition is environmentally friendly, can be utilized year round effectively for warm and cool turf needs, increases water retention (i.e., reduces amount of irrigation needed), aids in micronutrient uptake, provides soil biology, and prevents staining on concrete.

18 Claims, 17 Drawing Sheets
(17 of 17 Drawing Sheet(s) Filed in Color)

DETHATCHING, EXTENDED RELEASE FERTILIZER COMPOSITIONS

BACKGROUND OF THE INVENTION

1. Field of the Invention

This invention relates, generally, to fertilizer. More particularly, it relates to compositions for extended release fertilizer that can be used year-round on warm and cold turf.

2. Description of the Prior Art

The conventional art has seen a variety of fertilizer compositions that effectively provide nutrients to turf and other plants, a variety of methods of irrigating turf, and a variety of mechanical apparatuses that effectively dethatch turf. However, generally each of these processes must occur independently, and are time-consuming and environmentally-depleting.

Controlled-release or slow-release fertilizers exist in the prior art and contain appropriate percentages of nitrogen, phosphorous oxide, and potassium oxide (and optionally micronutrients), dictating the fertilizer's NPK rating. Controlled-release fertilizers might encounter an initial release from imperfections in the coating of the prills or from the exclusion of coating on particular prills. Thereupon, nutrients are released from these prills when water enters the prill and dissolves the fertilizer inside the prill, releasing the nutrients from the prill into the surrounding environment. Temperature of the soil then determines the release rate of the nutrients.

Slow-release fertilizers may include additional ingredients, such as sulfur, the thickness of which dictates penetration of water; wax, the presence of which prevents water from penetrating the sulfur layer; urea formaldehyde; and slowly (or low) soluble salts.

The prior art has seen use of humic acid in fertilizers as well. However, when turf is treated with products using humic acid, the turf has been seen to become worn down, as the humic acid is too aggressive and has not been added in an effective manner (e.g., amount, combination, secondary ingredients, etc.). Thus, persons of ordinary skill in this art have endured a long-felt but unresolved need to create a fertilizer with humic acid in granular form.

Dethatching, or scarification, is the process of rigorously abrading the turf to aerate the turf and loosen/remove the layer of thatch, or layer of living and dead organic matter knit together just above the soil surface. The presence of some thatch is acceptable and may actually help the turf, but excess thatch repels water or prohibits water and nutrients from reaching the soil and also encourages the presence of insects and diseases within the thatch. Mechanical apparatuses (e.g., vertical mowers) are used to dethatch turf by utilizing revolving vertical knives that cut the thatch and pull it to the surface of the turf. Certain bacterial agents have also been found to break down thatch, but the effects are short-lived. After dethatching or scarification via a vertical mower, the turf must be recovered since the mower pulled the thatch from beneath the surface of the turf. The turf can be recovered by applying fertilizer to the turf and watering the fertilizer into the turf.

Regarding irrigation, the Environmental Protection Agency states that "[n]ationwide, landscape irrigation is estimated to account for almost one-third of all residential water use, totaling more than 7 billion gallons per day." Not only do people over-water their turf (having a negative domino effect, for example the Calussahatchee River emptying into Fort Myers and surrounding islands), conventional synthetic fertilizers require excessive amount of water to produce a healthy turf, leading to a depletion of natural resources. This is a very serious problem in the United States.

Additionally, if an individual wishes and is allowed to irrigate his/her turf around the year, conventional fertilizers are unable to meet warm and cool season turf needs.

Accordingly, what is needed is a dethatching, water-retaining fertilizer that can be applied effectively around the year. However, in view of the art considered as a whole at the time the present invention was made, it was not obvious to those of ordinary skill how the art could be advanced.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

The long-standing but heretofore unfulfilled need for an improved, extended release and dethatching fertilizer is now met by a new, useful and nonobvious invention.

The current invention describes a novel fertilizer composition that dethatches and irrigates soil over a period of time (extended or quick) and in certain embodiments is able to overcome the blackout periods (i.e., effective without restriction for warm and cool season turf needs).

In an embodiment, the fertilizer composition includes about 12% to about 17% by weight of a limestone product, about 4% to about 8% by weight of an iron product, up to 4% of a manganese product, up to 5% by weight of a sulfate of potash-magnesia, humus extract product, about 20% to about 25% by weight of a sulfate of potash product, and about 50% to about 54% by weight of a humic acid dispersing product.

The fertilizer composition may be substantially free of nitrogen.

The fertilizer may be substantially free of phosphorous.

The iron product may be less than about one-quarter inch in size.

The fertilizer composition may have a powder or pellet form.

In an embodiment, the limestone product can be ground limestone that is about 14.5% by weight of the fertilizer composition. The iron product can be granular iron that is about 6% by weight of the fertilizer composition. The manganese product can be granular manganese that is about 2% by weight of the fertilizer composition. The sulfate of potash-magnesia, humus extract product can be about 2.65% by weight of the fertilizer composition. The sulfate of potash product can be granular sulfate of potash that is about 22.8% by weight of the fertilizer composition. The humic acid dispersing product can be a humic acid dispersing granule that is about 52% by weight of the fertilizer composition.

The fertilizer composition may be polymer-coated for extended release of the nutrients contained in the ingredients. Alternatively, each ingredient, except for the humic acid dispersing product, can be polymer-coated to promote extended-release of those ingredients, and the humic acid dispersing product optionally may not be polymer-coated, thus promoting quick release of the humic acid, for example for more immediate dethatching purposes. Otherwise, the humic acid dispersing product may be polymer-coated as well.

In a separate embodiment, the current invention is a fertilizer composition that comprises about 24% to about 28% by weight of a limestone product, about 16% to about 20% by weight of a humic acid dispersing product, and about 54% to about 58% of a sulfate of potash-magnesia, humus extract product.

A growth-enhancing effective amount of nitrogen may be absent from the fertilizer composition.

A growth-enhancing effective amount of phosphorous may be absent from the fertilizer composition.

The fertilizer composition may have an encapsulated form.

In an embodiment, the limestone product can be ground limestone that is about 26.2% by weight of the fertilizer composition. The humic acid dispersing product can be a humic acid dispersing granule that is about 18% by weight of the fertilizer composition. The sulfate of potash-magnesia, humus extract product can be about 55.8% by weight of the fertilizer composition.

The fertilizer composition may be polymer-coated for extended release of the nutrients contained in the ingredients. Alternatively, each ingredient, except for the humic acid dispersing product, can be polymer-coated to promote extended-release of those ingredients, and the humic acid dispersing product optionally may not be polymer-coated, thus promoting quick release of the humic acid, for example for more immediate dethatching purposes. Otherwise, the humic acid dispersing product may be polymer-coated as well.

The fertilizer composition can further include a soluble potassium product that makes up about 10% to about 14% by weight of the fertilizer composition, where the soluble potassium product is derived from or contained in the limestone product.

The fertilizer composition can further include a humic acid product that makes up about 9% to about 14% by weight of the fertilizer composition, where the humic acid product is derived from the humic acid dispersing product.

An advantage of the fertilizer composition is that it is environmentally efficient and effective, and can be utilized year round without restriction for warm and cool season turf needs.

Another advantage of the fertilizer composition is that it increases water retention, aids in micronutrient uptake and provides soil biology.

Another advantage of the fertilizer composition is that it acts as a soil conditioner, reducing the amount of irrigation time needed for the turf to which the fertilizer is applied, thus saving water.

Another advantage of the fertilizer composition is that particular agents contained therein prevent staining on concrete, pavers, etc., if over-broadcasting should occur during application of the fertilizer.

Another advantage of the fertilizer composition is that the combination of ingredients includes an unexpected benefit such that the fertilizer does not contribute to red/blue algae blooms, as conventional fertilizers do.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the nature and objects of the invention, reference should be made to the following detailed disclosure, taken in connection with the accompanying drawings, in which.

DETAILED DESCRIPTION OF THE PREFERRED EMBODIMENT

Figure 1:
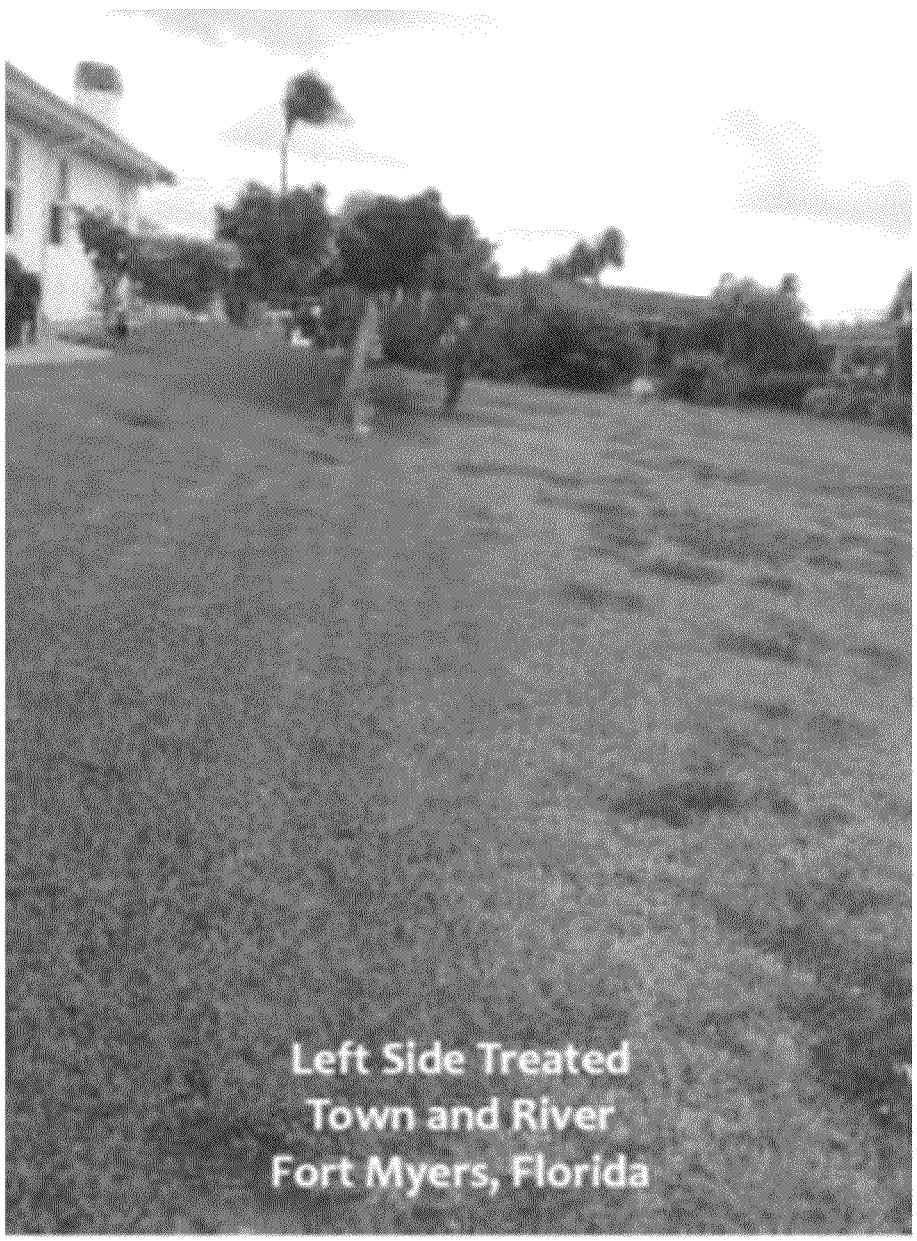
FIG. 1 is a comparative view of turf treated with an embodiment of the current invention versus a turf treated with conventional fertilizer.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

In an embodiment, the current invention describes a novel granule fertilizer composition with a dethatching agent. The fertilizer composition includes natural potassium, various micronutrients, humic or humatic acid and composted humus.

The composition includes embodiments containing nitrogen and embodiments that are substantially free of nitrogen (i.e., do not have a growth-enhancing effective amount of nitrogen). Nitrogen typically is a byproduct of humic acid when the humic acid is released. Nitrogen in fertilizer can help in the efficient and healthy growth of turf, thereby improving yield of turf. It also has other known benefits in crops and other plants. However, often times individuals apply an excessive amount of fertilizer to their turf, resulting in an excessive amount of nitrogen infiltrating the air, soil and waters, contributing to pollution and greenhouse gases. Thus, there are advantages to the novel composition both having nitrogen and being substantially free of nitrogen.

The natural potassium in the composition may be in the form of potash, which breaks down organic nitrogen found either in the soil or as released from the fertilizer.

The micronutrients of the current composition may include various amounts of sulfur, iron, manganese, and magnesium. Sulfur is broken down to produce an acid that leads to a lower pH in the soil. A lower pH in the soil allows iron to be more readily accessible to the turf as a micronutrient. Iron, in turn, provides the green coloring in the turf, along with strengthening the roots of the turf. The inclusion of manganese improves root strength, aids in the photosynthesis process, and helps reduce diseases in turf. The inclusion of magnesium improves root strength, conditions the soil, aids in the photosynthesis process, carries phosphorous in the turf, synthesizes sugar and displaces starch, forms constructive plant oils and fats, controls nutrient update, and increases accessibility of iron. Iron sucrate and magnesium sucrate, optionally included in the composition, prevent staining on concrete, pavement, and other extraneous material lying adjacent to the turf to which a fertilizer can be applied. Chlorine may also be added to the composition to stabilize chemical use on the turf. Various inert ingredients may also be added to enhance the effectiveness and safety of the fertilizer. The inert ingredients stabilize the soil at about pH 7.7 and complete turf migration to warm or baron areas.

The fertilizer composition further includes composted humus containing humatic or humic acid, optionally encapsulated or in pellet form. Humus compounds are complex natural organic compounds that are formed in soils from the degradation of plant and animal residues by humification. Humic acid generally refers to combined humic and/or fulvic acid content found in composted humus.

Humic acid has a range of beneficial impacts on the growth and cultivation of crops (vegetable and non-vegetable), citrus, turf, flowers, and particularly organically-deficient soils. The addition of humic acid to fertilizer adds organic matter to organically-deficient soils, increases root vitality, improves nutrient uptake, increases chlorophyll synthesis, enhances seed germination, increases fertilizer retention, stimulates beneficial microbial activity, increases health in plants, and improves yields.

When applied to clay soils, humic acid can help break up compacted soils (i.e., dethatching), allowing for enhanced water penetration and better root zone growth and development. When applied to sandy soils, humic acid adds essential organic material necessary for water retention thus improving root growth and enhancing the sandy soil's ability to retain and not leach out vital plant nutrients.

Additionally, in combination with the other ingredients in the present combination, humic acid was seen to decompose thatch and to decrease the amount of water irrigation needed on the turf. Due to the healthier turf, a marked decreases in disease was also observed, along with a marked reduction in chinch bugs, ants, and grub worms. Further, in combination with the ingredients included in the embodiments of the current invention, humic acid in dust or powder form typically releases in about four (4) weeks with residue remaining for self-regeneration when reapplied. The encapsulated humic acid can be reapplied in about eight (8) weeks to enhance the effects of the humic acid.

As indicated previously, one way plant growth is improved is through the structural improvement of both clay and sandy soil allowing for better root growth development. Plant growth is also improved by the ability of the plant to uptake and receive more nutrients. Humic acid is especially beneficial in freeing up nutrients in the soil so that they are made available to the plant as needed. For instance, if an aluminum molecule is bound with a phosphorus molecule, humic acid breaks the bond, thus making the phosphorus available for the plant. Humic acid is also especially important because of its ability to chelate micronutrients increasing their bioavailability.

The activities of beneficial soil microbes are crucial for the sustainability of any soil and plant growth. Humic acid stimulates microbial activity by providing the indigenous microbes with a carbon source for food, thus encouraging their growth and activity. Soil microbes are responsible for solubilizing vital nutrients such as phosphorus that can then be absorbed by the humic acid and in turn made available to the plant. Additionally, microbes are responsible for the continued development of humus in the soil as it continues to break down not fully decomposed organic matter. This in situ production of humus continues to naturally add to the humic acid base and its benefits.

Humic acid is an effective agent to use as a complement to synthetic or organic fertilizers. In many instances, regular humic acid use will reduce the need for fertilization due to the soil's and plant's ability to make better use of it. In some occurrences, fertilization can be eliminated entirely if sufficient organic material is present and the soil can become self-sustaining through microbial processes and humus production.

In a separate embodiment, the current invention enables a method of producing a fertilizer composition. The method includes mixing natural potassium, various micronutrients, humic acid and composted humus in appropriate percentages that optimize the effect of each ingredient.

Because of the synergistic benefits of the composition embodiments of the current invention, a separate embodiment of the invention enables a method of fertilizing turf using the novel compositions. Embodiments of the current invention are effective about twice as long as conventional fertilizers and do not leach out, as it actually regenerates nutrients over that period because of the humic acid. The humic acid typically provides regeneration for over fifteen (15) weeks (regeneration in plants is about sixteen (16) days to about twenty (20) days), but in a preferred embodiment, the fertilizer would be reapplied after eight (8) weeks to provide overlap and immediate response from the plant. Because the current composition does not leach out, the fertilizer can be applied in six (6) to eight (8) week intervals throughout the year, meaning the current invention is effective also during the blackout period, when most fertilizers fail to promote significant growth, particularly during the period of June $1^{st}$ through September $30^{th}$ of the calendar year. Additionally, the fertilizer dethatches and irrigates turf, thus minimizing the labor and water required to promote a healthy turf.

Example 1

The composition includes about 60% granular humic acid base, about 16% nitrogen, about 10.8% sulfur, about 8% potash, about 4% iron, about 0.2% manganese, and about 1% inert ingredients.

The method of producing the composition includes mixing about 10.8% sulfur and about 4% iron into a uniform mixture. About 16% nitrogen, about 8% potash, and about 0.2% manganese are then added into the mixture. About 1% inert ingredients are then added into the resultant mixture. Finally, about 60% granular humic acid base is added into the resultant mixture to form the granular fertilizer composition.

Optionally, all ingredients in the fertilizer composition are in granular form and are not polymer-coated, as the resultant composition is set for quick release.

Example 2

The composition includes about 52% granular humic acid base, about 11.53% sulfur, about 24% potash, about 6% iron, about 2% manganese, about 2% magnesium, and about 2.47% inert ingredients. In this embodiment, the composition is substantially free of nitrogen or does not have an amount of nitrogen that effectively enhances growth of the plants.

The method of producing the composition includes mixing about 11.53% sulfur and about 6% iron into a uniform mixture. About 8% potash, about 2% magnesium, and about 2% manganese are then added into the mixture. About 2.47% inert ingredients are then added into the resultant mixture. Finally, about 52% granular humic acid base is added into the resultant mixture to form the granular fertilizer composition without the requirement of polymer-coating the composition.

Optionally, the granular humic acid base is not polymer-coated and is set for quick release. However, the remainder of the ingredients in the fertilizer composition may be polymer-coated for the release of each ingredient.

Example 3

In another embodiment, the current invention is a composition that includes about 14.5% ground limestone, about 6% granular iron (e.g., GRANUSOL Fe 50% (less than ¼ inch in size) containing saccharated iron oxide at 70-100%, quartz at 1-3%, and amorphous silica at 5-10%), about 2% granular manganese (e.g., GRANUSOL Mn Suc containing manganese compounds at 35%, amorphous silica at 5-10%, quartz at less than 1%, and calcium oxide at 0-6%), about 22.8% granular sulfate of potash, about 52% humic acid dispersing granule (e.g., TURF PRO granula), and about 2.65% sulfate of potash-magnesia, humus extract. Each of the foregoing ingredients was obtained from GROWERS FERTILIZER CORPORATION (Lake Alfred, Fla.). It was found that soluble potassium (as $K_2O$) can be derived from the ground limestone, and soluble magnesium (as Mg), sulfur (combined, as S), and optionally chlorine can be derived from the sulfate of potash-magnesia, humus extract.

The ratios of the ingredients can be varied by about a 2-3% increase or a 2-3% decrease without losing effectiveness and also without burning or damaging the plants. When outside of these ranges, the effectiveness of the fertilizer begins to decrease, and chances of burning the plants increase. As such, ratios outside of the denoted ranges are contemplated in other embodiments.

In an embodiment, this composition would be in a powder form, though other forms (e.g., granular, spike, liquid) are contemplated as well. Additionally, the composition may be polymer-coated to promote extended release or may not be polymer-coated to promote quick release. Further, polymer-coating of the individual ingredients may be varied to promote extended and quick release of certain ingredients. For example, it may be the case where the humic acid dispersing granule is not polymer-coated and the remainder of the ingredients are polymer-coated. Thus, the humic acid dispersing granule is set for quick release (e.g., for more immediate dethatching purposes), whereas the remainder of the ingredients are set for extended release.

Example 4

In another embodiment, the current invention is a composition that includes about 26.2% ground limestone, about 18% humic acid dispersing granule, and about 55.8% sulfate of potash-magnesia, humus extract. Each of the foregoing ingredients was obtained from GROWERS FERTILIZER CORPORATION (Lake Alfred, Fla.). It was found that 12% of the fertilizer is soluble potassium (as $K_2O$), derived from the ground limestone. It was also found that 11.72% and 5.86% of the fertilizer is sulfur (combined, as S) and soluble magnesium (as Mg), respectively, derived from the sulfate of potash-magnesia, humus extract. Not more than 2% of the fertilizer was found to be chlorine, potentially also derived from the sulfate of potash-magnesia, humus extract. Finally, it was found that 11.16% of the fertilizer is humic acid (as Hu), derived from the humic acid dispersing granule.

The ratios of the ingredients can be varied by about a 2-3% increase or a 2-3% decrease without losing effectiveness and also without burning or damaging the plants. When outside of these ranges, the effectiveness of the fertilizer begins to decrease, and chances of burning the plants increase. As such, ratios outside of the denoted ranges are contemplated in other embodiments.

In an embodiment, this composition would be encapsulated according to methods known in the art, though other forms (e.g., powder, spike, liquid) are contemplated as well. Additionally, the composition may be polymer-coated to promote extended release or may not be polymer-coated to promote quick release. Further, polymer-coating of the individual ingredients may be varied to promote extended and quick release of certain ingredients. For example, it may be the case where the humic acid dispersing granule is not polymer-coated and the remainder of the ingredients are polymer-coated. Thus, the humic acid dispersing granule is set for quick release (e.g., for more immediate dethatching purposes), whereas the remainder of the ingredients are set for extended release.

Example 5

Based on a plurality of studies using embodiments of the current invention, an average of only one-third (⅓) of the irrigation was needed upon application of the novel compositions, thus conserving natural resources. The amount of the current fertilizer composition needed is about ten pounds per 1,000 square feet or 444 pounds per acre every eight (8-10) weeks. This is accomplished by the current fertilizer's ability to retain water and condition the soil. In turn, water retention improves root growth. Exceptional results were observed on citrus, turfgrass, flowers and vegetable plants.

Additionally, supplementary fertilizers, such as SCOTTS® TURF BUILDER®, were not needed for healthy growth of turf. This is accomplished by the current fertilizer's abilities to aid in micronutrient uptake and provide soil biology. Costs were reduced based on minimizing both labor and supplementary fertilizers. Approximately a 60% savings in fertilizer usage was observed.

Barren areas were treated with embodiments of the current invention both in the fall and in the winter. Within approximately 3-5 days, completely new shoots were observed. In a separate study, a golf course was treated with an embodiment of the current invention. Because of this treatment, plugging, sanding after plugging, and verticutting were significantly reduced, thereby further decreasing cost of maintenance. Considering all studies, conventional fertilizers were seen to have a success rate of about 40%, where embodiments of the current invention were seen to have a success rate of about 98%.

FIGS. 1-6 show comparative side-by-side views of various finite areas of turf treated with an embodiment of the current invention versus a turf treated with a conventional fertilizer. The turfs treated with embodiments of the current invention are seen to be fuller and healthier than those turfs treated with fertilizer compositions of the prior art.

Figure 2:
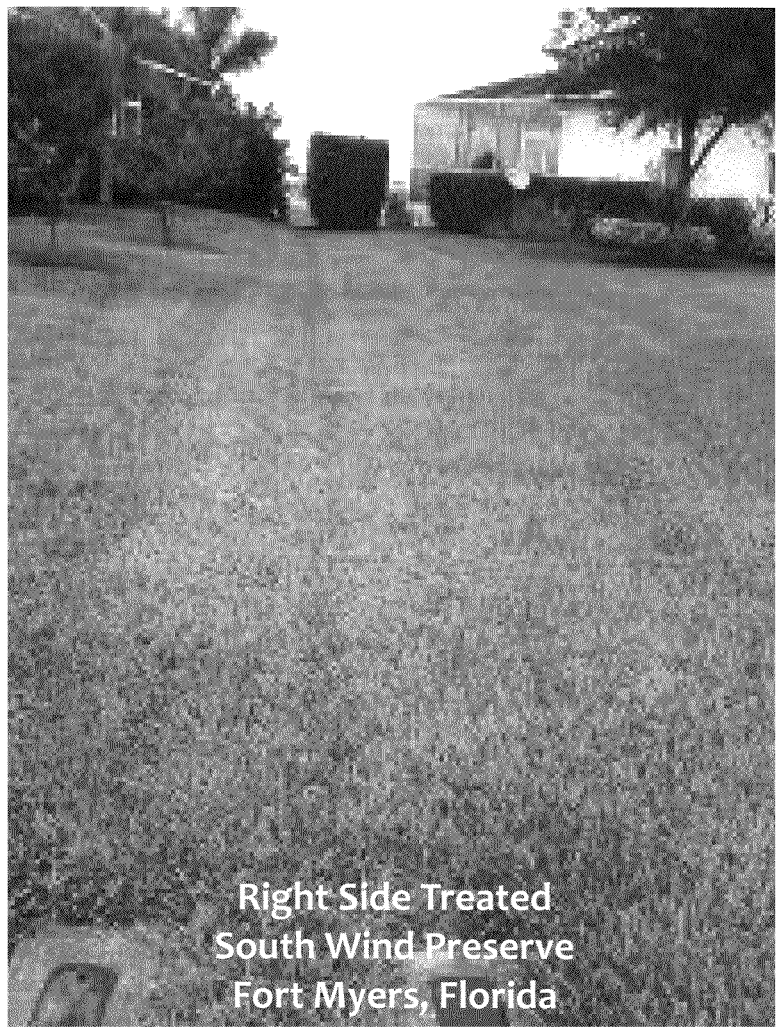
FIG. 2 is a comparative view of turf treated with an embodiment of the current invention versus a turf treated with conventional fertilizer.
Figure 3:
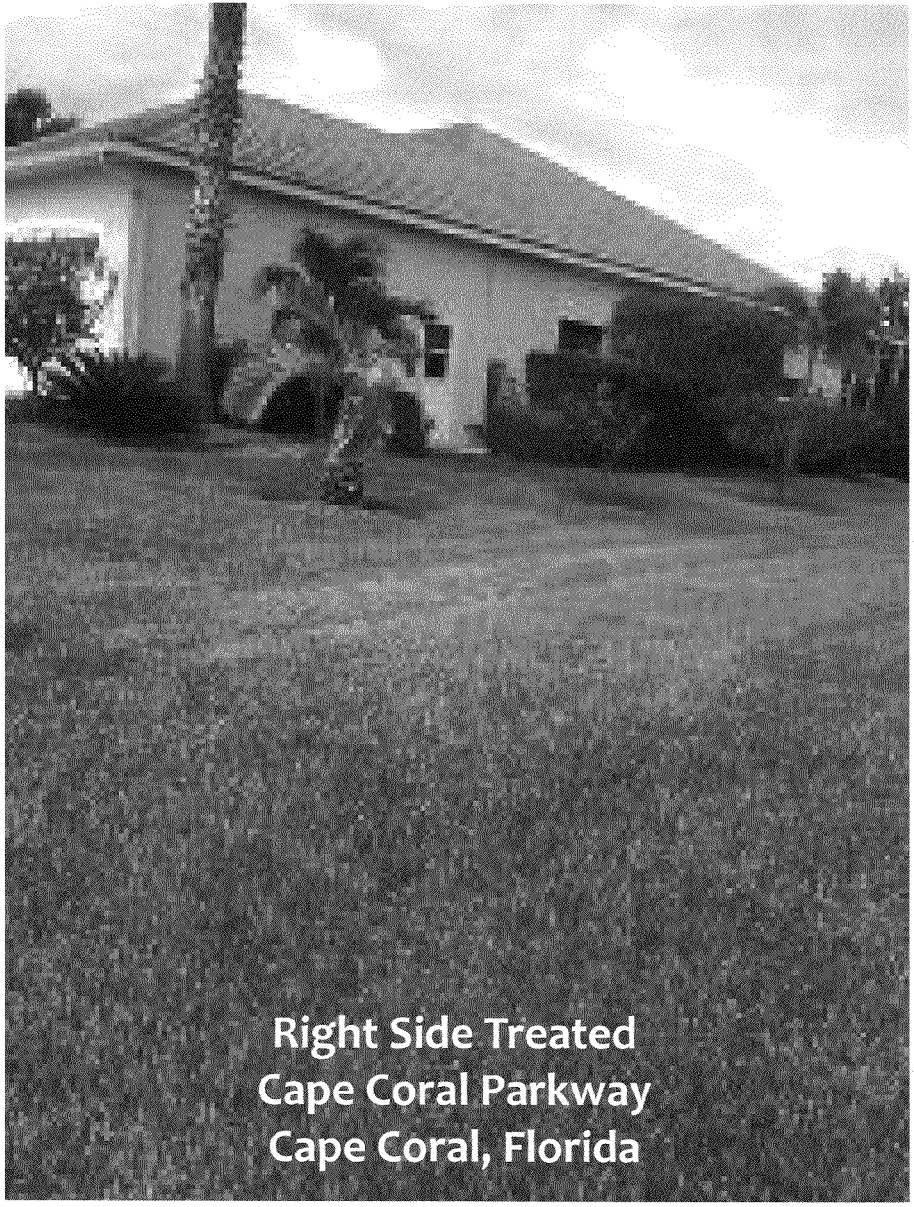
FIG. 3 is a comparative view of turf treated with an embodiment of the current invention versus a turf treated with conventional fertilizer.
Figure 4:
FIG. 4 is a comparative view of turf treated with an embodiment of the current invention versus a turf treated with conventional fertilizer.
Figure 5:
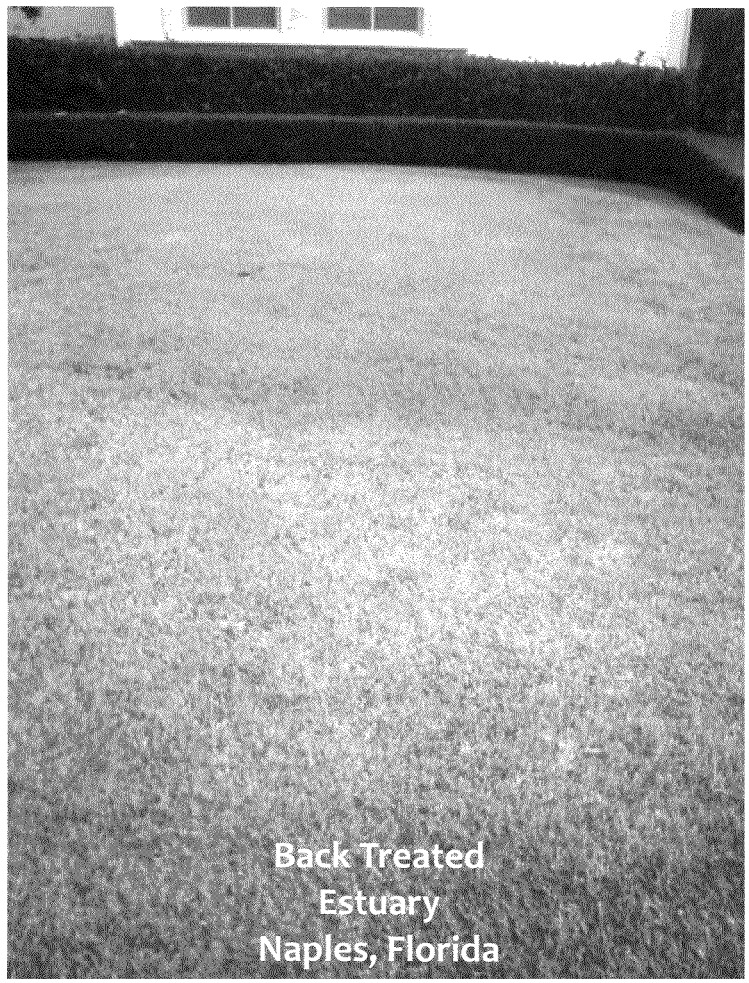
FIG. 5 is a comparative view of turf treated with an embodiment of the current invention versus a turf treated with conventional fertilizer.
Figure 6:
FIG. 6 is a comparative view of turf treated with an embodiment of the current invention versus a turf treated with conventional fertilizer.

More specifically, in FIG. 1, the left side of the turf in Ft. Myers, Fla. has been treated with an exemplary composition of the current invention, whereas the right side of the turf has been treated with conventional fertilizers. In FIG. 2, the right side of the turf in Ft. Myers, Fla. has been treated with an exemplary composition of the current invention, whereas the left side of the turf has been treated with conventional fertilizers. In FIG. 3, the right side of the turf in Cape Coral, Fla. has been treated with an exemplary composition of the current invention, whereas the left side of the turf has been treated with conventional fertilizers. In FIG. 4, the back region of the turf in Cape Coral, Fla. has been treated with an exemplary composition of the current invention, whereas the front region of the turf has been treated with conventional fertilizers. In FIG. 5, the back region of the turf in Naples, Fla. has been treated with an exemplary composition of the current invention, whereas the front region of the turf has been treated with conventional fertilizers. In FIG. 6, the left side of the turf has been treated with an exemplary composition of the current invention, whereas the right side of the turf has been treated with conventional fertilizers.

In each of FIGS. 1-6, the embodiment of the composition of Example 3 was utilized over a period of time with conventional fertilizer used on the adjacent turfgrass as indicated previously.

The following examples depict several experiments or studies utilized to test the efficacy of the foregoing novel compositions, in particular that of Example 4 unless otherwise indicated, and should not be considered limiting of the scope of the current invention.

Example 6

In this study, St. Augustine grass was planted in the novel composition at normal drop spreader number 8 and broadcast number 8.5. For comparison, the same species St. Augustine grass was planted in conventional fertilizer at normal drop spreader number 9 and broadcast number 9.5. The results of this experimental group using conventional fertilizer was either observed or given a best estimation based on known principles. Table 1 depicts a comparison of the results of growth of St. Augustine grass in this example.

TABLE 1

| Plant Type | Treatment | Timing | Result |
|---|---|---|---|
| St. Augustine Grass | Applicant fertilizer at normal drop spreader number 8 | 24 days | 3-4.5 inches |
| St. Augustine Grass | Conventional fertilizer at normal drop spreader number 9 | 90 days | 0.5-1 inches |

Figure 7:
FIG. 7 depicts growth of St. Augustine grass at 24 days using an exemplary embodiment of the composition of the current invention.

Additionally, the novel fertilizer embodiment resulted in growth intrusion (lateral width of growth) of two (2) feet over 24 days, whereas the conventional fertilizer results in growth intrusion of two (2) feet only after 90 days. FIG. 7 depicts St. Augustine grass growing in the media containing an exemplary composition, in particular that of Example 3, of the current invention.

Example 7

In this study, St. Augustine grass was planted in the novel composition at normal drop spreader number 8 and broadcast number 8.5. For comparison, the same species St. Augustine grass was planted in conventional fertilizer at normal drop spreader number 9 and broadcast number 9.5. The results of this experimental group using conventional fertilizer was either observed or given a best estimation based on known principles. Table 2 depicts a comparison of the results of intrusion growth of St. Augustine grass in this example.

TABLE 2

| Plant Type | Treatment | Timing | Result |
|---|---|---|---|
| St. Augustine Grass | Applicant fertilizer at normal drop spreader number 8 | 48 days | 2 feet wide |
| St. Augustine Grass | Conventional fertilizer at drop normal spreader number 9 | 90 days | 2 feet wide |

Figure 8A:
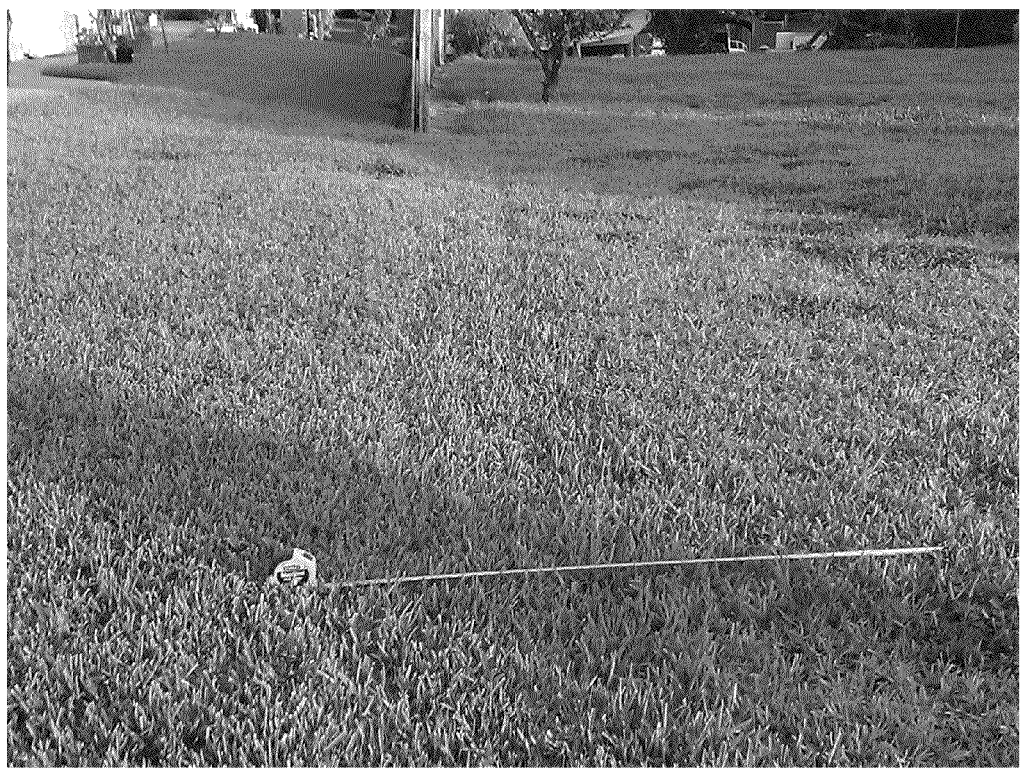
FIG. 8(a) depicts growth of St. Augustine grass at 48 days using an exemplary embodiment of the composition of the current invention.
Figure 8B:
FIG. 8(b) depicts growth of St. Augustine grass at 48 days using an exemplary embodiment of the composition of the current invention.

FIGS. 8(a) and 8(b) depict St. Augustine grass growing in the media containing an exemplary composition of the current invention, compared to the adjacent grass applied with conventional fertilizer.

Example 8

In this study, hibiscus and ixora were planted in a fertilizer of the novel invention. For comparison, the same species of hibiscus and ixora were planted in conventional fertilizer. The results of this experimental group using conventional fertilizer was either observed or given a best estimation based on known principles. Table 3 depicts a comparison of the results of growth of hibiscus and ixora in this example.

TABLE 3

| Plant Type | Treatment | Timing | Result |
|---|---|---|---|
| Hibiscus & Ixora | Applicant fertilizer at normal drop spreader number 8 | 24 days | 2 feet |

TABLE 3-continued

| Plant Type | Treatment | Timing | Result |
|---|---|---|---|
| Hibiscus & Ixora | Applicant fertilizer at normal drop spreader number 8 | 10 days | 12 inches |
| Hibiscus & Ixora | Conventional fertilizer at normal drop spreader number 9 | 60 days | 12 inches |

Figure 9:
FIG. 9 depicts growth of hibiscus and ixora at 10 days using an exemplary embodiment of the composition of the current invention.

FIG. 9 depicts hibiscus and ixora growing in the media containing an exemplary composition of the current invention.

Example 9

In this study, fig plants were planted in a fertilizer of the novel invention. For comparison, the same species of fig plants were planted in conventional fertilizer. The results of this experimental group using conventional fertilizer was either observed or given a best estimation based on known principles. Table 4 depicts a comparison of the results of growth of fig plants in this example.

TABLE 4

| Plant Type | Treatment | Timing | Result |
|---|---|---|---|
| Fig | Applicant fertilizer | 10 days | 12 inches |
| Fig | Conventional fertilizer | 90 days | 12 inches |

Figure 10:
FIG. 10 depicts growth of fig plants at 10 days using an exemplary embodiment of the composition of the current invention.

FIG. 10 depicts fig plants growing in the media containing an exemplary composition of the current invention.

Example 10

In this study, ivy topiary plants were planted in a fertilizer of the novel invention. For comparison, the same species of ivy topiary plants were planted in conventional fertilizer. The results of this experimental group using conventional fertilizer was either observed or given a best estimation based on known principles. Table 5 depicts a comparison of the results of growth of ivy topiary plants in this example.

TABLE 5

| Plant Type | Treatment | Timing | Result |
|---|---|---|---|
| Ivy Topiary | Applicant fertilizer | 10 days | Several inches |
| Ivy Topiary | Conventional fertilizer | 60 days | Several inches |

Figure 11:
FIG. 11 depicts growth of ivy topiary at 10 days using an exemplary embodiment of the composition of the current invention.
Figure 12:
FIG. 12 depicts growth of bare root orchids at 10 days using an exemplary embodiment of the composition of the current invention.

FIG. 11 depicts ivy topiary plants growing in the media containing an exemplary composition of the current invention.

Example 11

In this study, bare root orchids were planted in a fertilizer of the novel invention. For comparison, the same species of bare root orchids were planted in conventional fertilizer. The results of this experimental group using conventional fertilizer was either observed or given a best estimation based on known principles. Table 5 depicts a comparison of the results of growth of bare root orchids in this example.

TABLE 6

| Plant Type | Treatment | Timing | Result |
|---|---|---|---|
| Bare Root Orchid | Applicant fertilizer | 10 days | Budding |
| Bare Root Orchid | Conventional fertilizer | 30 days | Budding |

Figure 13:
FIG. 13 depicts growth of tomato plants at 32 days using an exemplary embodiment of the composition of the current invention.

FIG. 13 depicts bare root orchids growing in the media containing an exemplary composition of the current invention.

Example 12

In this study, tomato plants were planted in a sand and seed pod in peat and the novel composition at normal drop spreader number 15. For comparison, the same species tomato plants were planted in a sand and seed pod in peat and conventional fertilizer at normal drop spreader number 15. The results of this experimental group using conventional fertilizer was either observed or given a best estimation based on known principles. Table 7 depicts a comparison of the results of growth of tomato plants in this example.

TABLE 7

| Plant Type | Treatment | Timing | Result |
|---|---|---|---|
| Tomato plant | Planted in sand/seed pod in peat/Applicant fertilizer at normal drop spreader number 8 | 32 days | 24 inches |
| Tomato plant | Planted in sand/seed pod in peat/conventional fertilizer at normal drop spreader number 9 | 32 days | 12 inches or less |
| Tomato plant | Planted in sand/seed pod in peat/conventional fertilizer at normal drop spreader number 9 | 45-60 days | 24 inches |

FIG. 13 depicts the tomato plants growing in the media containing an exemplary composition of the current invention.

Example 13

In this study, pepper plants were planted in a sand and seed pod in peat and the novel composition at normal drop spreader number 8 and broadcast number 8.5. For comparison, the same species pepper plants were planted in a sand and seed pod in peat and conventional fertilizer at normal drop spreader number 9 and broadcast number 9.5. The results of this experimental group using conventional fertilizer was either observed or given a best estimation based on known principles. Table 8 depicts a comparison of the results of growth of pepper plants in this example.

TABLE 8

| Plant Type | Treatment | Timing | Result |
|---|---|---|---|
| Pepper plants | Planted in sand/seed pod in peat/Applicant fertilizer at normal drop spreader number 8 | 32 days | 17 inches |
| Pepper plants | Planted in sand/seed pod in peat/conventional fertilizer at normal drop spreader number 9 | 32 days | 8-10 inches |
| Pepper plants | Planted in sand/seed pod in peat/conventional fertilizer at normal drop spreader number 9 | 60 days | 17 inches |

Figure 14:
FIG. 14 depicts growth of pepper plants at 32 days using an exemplary embodiment of the composition of the current invention.

FIG. 14 depicts the pepper plants growing in the media containing an exemplary composition of the current invention.

Example 14

In this study, cuttings were planted in a fertilizer of the novel invention. For comparison, the same species of cuttings were planted in conventional fertilizer. The results of this experimental group using conventional fertilizer was either observed or given a best estimation based on known principles. Table 9 depicts a comparison of the results of growth of cuttings in this example.

TABLE 9

| Plant Type | Treatment | Timing | Result |
|---|---|---|---|
| Cuttings | Applicant fertilizer | 16 days | Root growth |
| Cuttings | Conventional fertilizer | 24-30 days | Root growth |

Figure 15:
FIG. 15 depicts growth of cuttings at 16 days using an exemplary embodiment of the composition of the current invention.

FIG. 15 depicts Christmas palm trees growing in the media containing an exemplary composition of the current invention.

Example 15

In this study, Christmas palm trees were planted in a fertilizer of the novel invention. For comparison, the same species of Christmas palm trees were planted in conventional fertilizer. The results of this experimental group using conventional fertilizer was either observed or given a best estimation based on known principles. Table 10 depicts a comparison of the results of growth of Christmas palm trees in this example.

TABLE 10

| Plant Type | Treatment | Timing | Result |
|---|---|---|---|
| Christmas palm tree | Applicant fertilizer | 60 days | sprout |
| Christmas palm tree | Conventional fertilizer | 90 days | sprout |

Figure 16:
FIG. 16 depicts growth of Christmas palm trees at 40 days using an exemplary embodiment of the composition of the current invention.

FIG. 16 depicts Christmas palm trees growing in the media containing an exemplary composition of the current invention.

Example 16

A blind soil core test of turf in Ft. Myers, Fla. was performed by JOHN DEERE LANDSCAPES (Ft. Myers, Fla.) and CLC LABS (Westerville, Ohio). The turf was primarily St. Augustine grass and used only an embodiment of the composition of the current invention. The blind soil test was performed at six (6) inch depth. The sample information can be seen in Table 11.

TABLE 11

| Sample Information | | | Fertilizer Recommendations in pounds per 1,000 square feet per season | | |
|---|---|---|---|---|---|
| Plant Type | Area Type | Fert/Maint. Level | Nitrogen | $P_2O_5$ | $K_2O$ |
| St. Augustine | Residential Turf | High | 5.5-6.5 | 1.5 | 2.0 |

The key standards for CLC LABS is as follows. For soil pH, most turf and ornamentals prefer a pH of 6.0 to 7.5; under standards of the PROFESSIONAL GOLFERS ASSOCIATION, neutral is pH 7.6. Cation exchange capacity (CEC) determines the relative nutrient holding capacity of the soil for various cations, including $K^+$, $Ca^+$, $Mg^+$, $H^+$, and $Na^+$ (if Na test is requested). Typical CEC values are dependent on soil texture. However, relative nutrient holding capacity CEC is very low is below 5, low if below 10, medium if 10-22, and high is greater than 22. For percent base saturation, these values show the percentage of the CEC occupied by each of the tested cations. Ideal percentages of the cations lie balanced in the following ranges for most turfgrasses and ornamentals: 2-7% for K, 65-85% for Ca, and 10-20% for Mg. Table 12 depicts the results of the blind soil test.

TABLE 12

| | Results of Analysis | | | | Calculated Values | | | |
|---|---|---|---|---|---|---|---|---|
| | | Pounds per Acre Available Nutrient | | | Cation Exchange | % Base Saturation | | |
| Soil pH | P | K | Ca | Mg | Capacity | K | Ca | Mg |
| 7.7 | 38 | 207 | 5239 | 597 | 15.9 | 1.7 | 82 | 16 |

Additionally, it was found that watering of the turfgrass was reduced to about twenty-one (21) minutes per week.

Overall, the total results of the testing by JOHN DEERE LANDSCAPES and CLC LABS at six (6) inch depth was found to be adequate. Further, the estimate of the organic matter solubles of organic matter content of the soil was determined by the UNITED STATES GOLF ASSOCIATION to be perfect.

DEFINITION OF CLAIM TERMS

Derived from: This term is used herein to refer to a particular compound, composition, nutrient or substance that is contained in or obtained from an ingredient included in fabricating one or more compositions of the current invention.

Encapsulated form: This term is used herein to refer to a physical formation of fertilizer in capsules, typically larger than the powder form. Typically, fertilizer in encapsulated form is used for slow- or controlled-release.

Growth-enhancing effective amount of nitrogen: This term is used herein to refer to containing zero amounts of nitrogen or trace amounts of nitrogen due to impurities or minimal contamination. For example, the labeling of this fertilizer (using conventional labeling methods) could be 0-0-12, meaning 0% nitrogen, 0% phosphorous, and 12% potassium. However, nitrogen can be a byproduct of the release of humic acid.

Growth-enhancing effective amount of phosphorous: This term is used herein to refer to containing zero amounts of phosphorous or trace amounts of phosphorous due to impurities or minimal contamination. For example, the labeling of this fertilizer (using conventional labeling methods) could be 0-0-12, meaning 0% nitrogen, 0% phosphorous, and 12% potassium. However, phosphorous can be a byproduct of the release of humic acid.

Humic acid dispersing product: This term is used herein to refer to any composition that is capable of distributing or releasing humic acid for the production of plant growth.

Iron product: This term is used herein to refer to any composition that contains iron and/or oxidized forms of iron for the promotion of plant growth.

Limestone product: This term is used herein to refer to any composition that contains limestone in terms of variations of agricultural lime or agricultural limestone as used in fertilizers.

Manganese product: This term is used herein to refer to any composition that contains manganese and/or oxidized forms of manganese for the production of plant growth.

Polymer-coated: This term is used herein to refer to the lining of fertilizer particles or granules with a polymer membrane to control release of the contents of the particles or granules.

Powder form: This term is used herein to refer to a physical formation of fertilizer in fine particles.

Sulfate of potash: This term is used herein to refer to any composition containing potassium sulfate ($K_2SO_4$) for the production of plant growth.

Sulfate of potash-magnesia, humus extract product: This term is used herein to refer to any composition containing sulfate of potash-magnesia (varying combinations of potassium, sulfur, and magnesium) and humus extract for the production of plant growth.

It will thus be seen that the objects set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A fertilizer composition, comprising:
   a limestone product in an amount of approximately 12% to approximately 17% by weight of said fertilizer composition;
   an iron product in an amount of approximately 4% to approximately 8% by weight of said fertilizer composition;
   a manganese product in an amount up to approximately 4% by weight of said fertilizer composition;
   a sulfate of potash-magnesia, humus extract product in an amount up to approximately 5% by weight of said fertilizer composition;
   a sulfate of potash product in an amount of approximately 20% to approximately 25% by weight of said fertilizer composition; and
   a humic acid dispersing product in an amount of approximately 50% to approximately 54% by weight of said fertilizer composition.

2. A fertilizer composition as in claim 1, wherein a growth-enhancing effective amount of nitrogen is absent from said fertilizer composition.

3. A fertilizer composition as in claim 1, further comprising:
   said iron product being about ¼ inch in size or smaller.

4. A fertilizer composition as in claim 1, further comprising:
   said fertilizer composition having a powder form.

5. A fertilizer composition as in claim 1, further comprising:
   said limestone product being a ground limestone product that is approximately 14.5% by weight of said fertilizer composition;
   said iron product being a granular iron product that is approximately 6% by weight of said fertilizer composition;
   said manganese product being a granular manganese product that is approximately 2% by weight of said fertilizer composition;
   said sulfate of potash-magnesia, humus extract product being approximately 2.65% by weight of said fertilizer composition;
   said sulfate of potash product being a granular sulfate of potash product that is approximately 22.8% by weight of said fertilizer composition; and
   said humic acid dispersing product being a humic acid dispersing granule that is approximately 52% by weight of said fertilizer composition.

6. A fertilizer composition as in claim 1, further comprising:
   said fertilizer composition being polymer-coated for extended release of nutrients.

7. A fertilizer composition as in claim 1, further comprising:
   said limestone product, said iron product, said manganese product, said sulfate of potash product, and said sulfate of potash-magnesia, humus extract product each being polymer-coated to promote extended release; and
   said humic acid dispersing product not being polymer-coated to promote quick release.

8. A fertilizer composition, comprising:
   a limestone product in an amount of approximately 24% to approximately 28% by weight of said fertilizer composition;
   a humic acid dispersing product in an amount of approximately 16% to approximately 20% by weight of said fertilizer composition; and
   a sulfate of potash-magnesia, humus extract product in an amount of approximately 54% to approximately 58% by weight of said fertilizer composition.

9. A fertilizer composition as in claim 8, further comprising:
   said fertilizer composition being substantially free of nitrogen.

10. A fertilizer composition as in claim 8, further comprising:
    said fertilizer composition being substantially free of phosphorous.

11. A fertilizer composition as in claim 8, further comprising:
    said fertilizer composition having an encapsulated form.

12. A fertilizer composition as in claim 8, further comprising:
    said limestone product being a ground limestone product that is approximately 26.2% by weight of said fertilizer composition;
    said humic acid dispersing product being a humic acid dispersing granule that is approximately 18% by weight of said fertilizer composition; and
    said sulfate of potash-magnesia, humus extract product being approximately 55.8% by weight of said fertilizer composition.

13. A fertilizer composition as in claim 8, further comprising:
    said fertilizer composition being polymer-coated for extended release of nutrients.

14. A fertilizer composition as in claim 8, further comprising:
    said limestone product and said sulfate of potash-magnesia, humus extract product each being polymer-coated to promote extended release; and
    said humic acid dispersing product not being polymer-coated to promote quick release.

15. A fertilizer composition as in claim 8, further comprising:
- a soluble potassium product making up approximately 10% to approximately 14% by weight of said fertilizer composition, said soluble potassium product derived from said limestone product.

16. A fertilizer composition as in claim 8, further comprising:
- a sulfur product making up approximately 9% to approximately 14% by weight of said fertilizer composition, said sulfur product derived from said sulfate of potash-magnesia, humus extract product.

17. A fertilizer composition as in claim 8, further comprising:
- a soluble magnesium product making up approximately 3% to approximately 8% by weight of said fertilizer composition, said soluble magnesium product derived from said sulfate of potash-magnesia, humus extract product.

18. A fertilizer composition as in claim 8, further comprising:
- a humic acid product making up approximately 9% to approximately 14% by weight of said fertilizer composition, said humic acid product derived from said humic acid dispersing product.

\* \* \* \* \*